United States Patent [19]

Wiedemann

[11] Patent Number: 5,151,342

[45] Date of Patent: Sep. 29, 1992

[54] MULTILAYER RECORDING MEDIUM FOR OPTICAL INFORMATION

[75] Inventor: Wolfgang Wiedemann, Geisenheim, Fed. Rep. of Germany

[73] Assignee: Hoechst Aktiengesellschaft, Frankfurt am Main, Fed. Rep. of Germany

[21] Appl. No.: 299,346

[22] Filed: Jan. 23, 1989

[30] Foreign Application Priority Data

Jan. 25, 1988 [DE] Fed. Rep. of Germany ....... 3802031

[51] Int. Cl.⁵ .................. G03C 1/735; G03C 1/76
[52] U.S. Cl. .................. 430/271; 430/495; 430/945
[58] Field of Search .............. 430/270, 495, 945, 271, 430/321

[56] References Cited

U.S. PATENT DOCUMENTS

| | | | |
|---|---|---|---|
| 4,032,691 | 6/1977 | Kido et al. | 428/304 |
| 4,241,355 | 12/1980 | Bloom et al. | 346/135.1 |
| 4,298,975 | 11/1981 | Van Der Veen et al. | 369/94 |
| 4,492,750 | 1/1985 | Law et al. | 430/494 |
| 4,529,688 | 7/1985 | Law et al. | 430/494 |
| 4,605,607 | 8/1986 | Nikles et al. | 430/17 |
| 4,636,804 | 1/1987 | Kuder | 346/1.1 |
| 4,719,613 | 1/1988 | Hirose et al. | 369/109 |
| 4,725,525 | 2/1988 | Kenney et al. | 430/270 |
| 4,735,889 | 4/1988 | Namba et al. | 430/273 |
| 4,798,781 | 1/1989 | Hirose et al. | 430/270 |
| 4,814,256 | 3/1989 | Aldag et al. | 430/270 |
| 4,886,685 | 12/1989 | Wegner et al. | 427/430.1 |

FOREIGN PATENT DOCUMENTS 0188331 7/1986 European Pat. Off.
0191215 8/1986 European Pat. Off.

Primary Examiner—Charles L. Bowers, Jr.
Assistant Examiner—John A. McPherson
Attorney, Agent, or Firm—Foley & Lardner

[57] ABSTRACT

The invention described a multilayer recording medium for optical information for use in a single recording operation and the process for its production. The multilayer recording medium essentially comprises a support and a layer comprising an unsubstituted naphthalocyanine dye. A binder layer is disposed between the support and the dye layer or the dye layer carries a binder layer which, in turn, is coated with a dye layer. Moreover, the invention describes composite systems, in particular, adhesive-bonded systems constructed from these multilayer recording media. As compared to recording media of the prior art, the media and composite systems according to the present invention exhibit a high reflectivity and require a lower write-pulse energy, while maintaining a particular contrast ratio.

22 Claims, 6 Drawing Sheets

MULTILAYER RECORDING MEDIUM FOR OPTICAL INFORMATION

BACKGROUND OF THE INVENTION

The present invention relates to a multilayer recording medium for optical information, which can be used for a single recording operation and essentially comprises a support and a layer comprising an unsubstituted naphthalocyanine dye.

Optical recording media for the recording of data are well known. In these media, the information is recorded in so-called "information pits" (diameter approx. 1 $\mu$m), which are present in concentric or spiral-shaped tracks. The information can be recorded at a high packing density and read by optical means.

In general, information is recorded in such a way that the energy of a laser diode, which has been focused to form a spot, is irradiated through a transparent support layer and absorbed by a layer that is present on the support layer and comprises a dye and a binder. In the process, the dye/binder layer is strongly heated for a short time, and as a result of changes in the physical state, for example, due to evaporation, melting and flow processes, the above-mentioned "information pits" are generated in the dye/binder system.

The above-described recording process produces a difference in the optical characteristics (such as reflection and transmission) of the irradiated and non-irradiated areas of the layer. The different intensities of the light reflected by the irradiated and non-irradiated areas are used in the reading process for identifying the information.

A great number of patent publications describe optical recording media for use in a single recording operation, which contain organic dyes, in particular, phthalocyanine derivatives. In the form of so-called "light-absorbing layers" these phthalocyanine derivatives exhibit a high degree of stability and they are also used in combination with light-reflecting layers, for example, comprising the metals Au, Te, and Al, as described in U.S. Pat. No. 4,241,355; U.S. Pat. No. 4,298,975; and in DE-A-34 46 418.

It is a disadvantage of such metallized, light-reflecting layers that they have a high heat conductivity which often results in a reduction of the speed of recording information on media of this kind.

Phthalocyanine derivatives in the so-called light-absorbing layers, in general, show low absorption values in the emission range of the laser diodes ($\lambda$ = 800–840 nm) used for irradiation. Particular phthalocyanines are therefore often post-treated, in a thermal process or by means of solvent vapors, in order to shift their absorption peak further into the longer wavelength region (U.S. Pat. No. 4,529,688).

In contrast, absorption in the longer wave-length region (above 800 nm) is, as a rule, achieved, when naphthalocyanine derivatives are used. It is, however, usually necessary for these naphthalocyanine derivatives to be substituted, for example, by tertiary butyl groups attached to an aromatic ring, or they must carry longer chain organic substituents on the central atom, e.g., silicon, to ensure a sufficiently high solubility in the binder layer (U.S. Pat. No. 4,492,750; EP-A-0 188 331; EP-A-0 191 215; EP-A-0 191 970; WO 8701-076-A).

The substituted naphthalocyanine derivatives have the disadvantage that they are difficult to synthesize and must be purified. Since they are dissolved in binders before being homogeneously applied to the supports (in particular by a spin-coating process) the reflectivity of the recording media is often considerably reduced. On the other hand, too low a binder content in these layers increases the close arrangement of the naphthalocyanine molecules and, as a consequence, recrystallization is more likely to occur, which, in turn, has an adverse influence on the optical characteristics of the recording media. Due to the difficulties that are still presented by the substituted naphthalocyanine derivatives in view of their solubility, the selection of suitable solvents for the binder layers is strongly restricted, when support layers comprising plastic materials, such as polycarbonate, polymethyl methacrylate, etc., are to be used.

DE-A-36 22 590 describes recording media comprising a support carrying a usually vapor-deposited naphthalocyanine layer which may be covered by a protective layer. A pigment layer having light-reflecting properties can, in particular, be arranged between the support and the naphthalocyanine layer or on top of the naphthalocyanine layer, optionally below the protective layer, if the latter is used. However, the recording sensitivity of these recording media still needs to be improved.

Multilayer arrangements are also known from other patent publications. For example, U.S. Pat. No. 4,032,691 and U.S. Pat. No. 4,636,804 describe recording media comprising a support, a light-absorbing layer which is mainly formed of metals such as, for example, nickel, aluminum, palladium, or gold and also contains specific dyes, and a porous binder layer disposed between these two layers. This version has the disadvantage that the preparation of the porous binder layer is expensive and difficult, and that the dye systems used in the absorbing layer are not very stable and show only a relatively low absorption in the required wavelength range of laser diodes.

SUMMARY OF THE INVENTION

It is therefore an object of the present invention to provide a multilayer recording medium for use in a single recording operation, which has a high recording sensitivity, has a high baseline reflectivity, has a high stability to light and atmospheric conditions, exclusively comprises non-toxic organic materials that are readily prepared, shows a low thermal conductivity, and can be used in laser-diode arrangements, i.e., has a corresponding absorption peak in the emission range of laser diodes.

These and other objects of the present invention are achieved by providing a multilayer recording medium for optical information, which can be used for a single recording operation and essentially comprises a support and a layer comprising an unsubstituted naphthalocyanine dye, wherein a binder layer is present between the support and the naphthalocyanine-dye layer.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
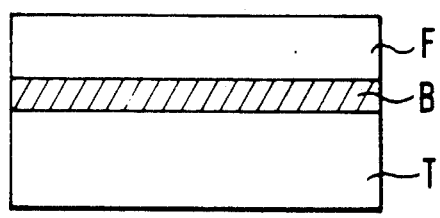
FIG. 1 shows a layer arrangement according to the present invention.

It was entirely unexpected to find that the arrangement according to the present invention, as compared with a layer sequence comprising a support and a naphthalocyanine layer, shows a considerably higher recording sensitivity and a high contrast ratio, when using light in the wavelength region from $\lambda = 800$ to 850 nm.

Suitable supports comprise transparent materials, which means that the recording and reading operations can be performed from the reverse side, as is usually done. The materials used include glass plates and, in particular, plastic materials, such as acrylic resins, for example, polymethyl methacrylate, polycarbonates, epoxy resins, polyvinyl chloride, polystyrenes, polyolefins and mixtures thereof.

The thicknesses of the supports are about 1 mm and are, in particular, in the range from 0.9 to 1.4 mm, particularly preferably from 1.1 to 1.3 mm.

In order to be suitable for recording media, the supports must also have a high optical quality, i.e., they must exhibit favorable values, for example, with regard to smoothness of the surface and birefringence. In addition, supports of this kind are provided with concentric or spiral-shaped track grooves which are applied, in particular to one side, by means of injection molding or by a photopolymerization process.

The light-absorbing layer comprises a thin film of an unsubstituted naphthalocyanine compound corresponding to the general formula I:

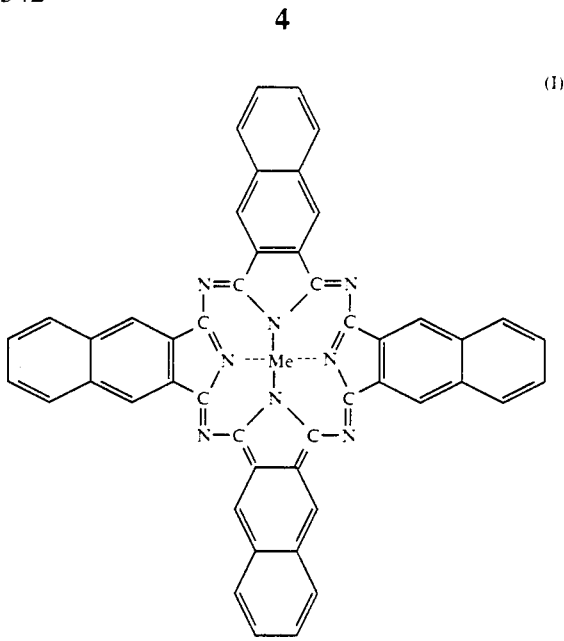

wherein

Me denotes either two hydrogen atoms or a metal, such as Cu, Zn, Al (e.g., in the form of $AlX^{2-}$), Ga, In, Si, Ge, Sn (e.g., in the form of $SnX_2^{2-}$), Pb, Mg, Ti, V (e.g., in the form of $VO^{2-}$), Cr, Mn, Fe, Co, Ni or Pd.

X stands for halogen, in particular chlorine or bromine and, in the case of more than bivalent metal ions, corresponds to the ligand which is in an axial position with respect to the naphthalocyanine plane.

These compounds are prepared according to methods known in the art, for example, by condensing 2,3-naphthalocyanines in a high-boiling solvent in the presence of metal salts or metal oxides to form the corresponding naphthalocyanine-metal complexes which are then purified [S. A. Mikhalenko, E. A. Luk'yanets, Zh. Ob. Khimii, Vol. 39 (11), 2554-2558 (1969)].

Thin layers of the dyes according to the general formula I have a high absorptivity in the longer wavelength or near infrared region, i.e., from 750 to 860 nm. However, preference is given to dyes having an absorption peak in the region from 770 to 830 nm. Such dyes include complex compounds of the general formula I, in which Me represents $VO^{2+}$, $AlCl^{2-}$, $SnCl_2^{2+}$ or Zn and others. They are preferred because their absorption peak corresponds to the emission of the laser diodes used.

These dyes not only have a favorable absorptivity but also an excellent reflectivity (baseline reflectivity) of more than 20% (as measured through the support). It is thus possible, and also preferred, to use very thin and compact layers of these naphthalocyanine dyes.

Measurements to determine the transmission, reflection and layer thickness (by means of a profilometer) can be made on dye layers of different thicknesses, comprising compounds of the general formula I. It can be demonstrated that optimum conditions for obtaining a reflection peak are present when the layer thickness is in the range from 90 to 120 nm. While absorption increases with an increasing layer thickness of the naphthalocyanine dye, reflectivity and recording sensitivity each pass through a peak and decrease again. The layer thicknesses used are therefore in the range from 30 to 200 nm, in particular, from 60 to 130 nm, and particularly preferably from 90 to 120 nm. These thin layers are also advantageous in view of their good adhesive properties, both on treated and untreated support materials. Unexpectedly, however, adhesion is particularly good on the binder layer and, according to the present invention, the dye layer is therefore applied to this binder layer.

Processes which can be used for applying the naphthalocyanine dyes to support materials, especially in the method according to the present invention, include cathodic sputtering, plasma polymerization, ionic plating, spin-coating, electrostatic spraying, and immersion. Particularly preferred is, however, deposition of the dye in vacuum, because this process yields optically dense, mostly olive-green colored and particularly adherent layers of superior homogeneity. What is more, by this vapor deposition process the dye is additionally purified and a readily controllable, homogeneous thickness distribution is ensured by means of an oscillating crystal.

Thermal stability is a further advantage of the dyes used according to the present invention and, in this connection, the naphthalocyanine dye of the $VO^{2-}$ ion is particularly preferred. On the one hand, thermal stability is an advantage, when the dye is to be applied according to the above-described vapor deposition process, on the other hand, a thermal stability of the dye that is too high is disadvantageous, since this can prove unfavorable to the recording process in the dye layer, the recording speed and the contrast ratio.

According to the present invention a binder layer is arranged between the support and the dye layer. It is unexpectedly found that this layer sequence results in very sensitive optical recording media. At the same time, a high adhesive strength of the vapor-deposited naphthalocyanine layer is ensured in multilayer systems of this kind.

The preferred binders are thermoplastic materials which, compared with the dye, have a low softening temperature and a low flowability in the cold. Also preferred are binders which decompose at temperatures, in particular, of 200° C. and above (cf. cellulose nitrates).

The binders used comprise cellulose derivatives, such as cellulose acetates, cellulose propionates and cellulose acetobutyrates, in particular, cellulose nitrates. Polyurethanes, polyesters, polycarbonates, polyamides, hydrocarbon resins, cyclized rubbers, polyacrylates and polymethyl methacrylates, polystyrenes and polystyrene copolymers, polyvinyl chloride, polyvinyl acetals, polyvinyl chloride/polyvinyl acetate copolymers, polyvinyl alcohols and phenoxy resins are also used. Styrene/acrylic resin copolymers and polyvinylidene chloride are, for example, employed for aqueous dispersions.

Cellulose nitrates and polystyrenes have proved particularly favorable.

Apart from individual binders, binder mixtures are also preferably used.

When untreated supports are employed, i.e., supports that do not have an additional coating, for example, of a polyvinyl alcohol, care must be taken that the solvents of the binders to be applied to the support do not incipiently dissolve the support material, in particular, if the latter comprises a polycarbonate or polymethyl methacrylate. An optionally present coating of a polyvinyl alcohol is prepared in such a way that an aqueous or alcoholic, particulary methanolic, solution of a polyvinyl alcohol is coated upon the support and the coating is subsequently dried.

The binders used for supports that have not been pretreated as described above preferably comprise those which dissolve in aliphatic or cyclic hydrocarbons, alcohols, glycol ethers, in particular, propylene glycol methyl ether, and others, or which form aqueous dispersions. In the coating of supports such as glass plates or plastic substrates, which have, for example, been pretreated or have a photocrosslinked surface any of the above-indicated binders can generally be used.

Since unsubstituted naphthalocyanine dyes are vapor-deposited onto the binder layer according to the method of the present invention, there is no risk of the dyes being incipiently dissolved or even actually dissolved by the solvents of the binders.

The binder solutions are applied to the previously cleaned supports by knife-coating, spin-coating, dip-coating or electrostatic spray-coating. The coated supports are then dried in the air, optionally in a vacuum. Coating is particularly preferably carried out according to the spin-coating process, by means of which binder layers having a thickness below 1 μm, in particular, below 250 nm can be obtained.

In the layer arrangement of the present invention, the layer thicknesses of the binder layers are, in particular, in the range from 30 to 300 nm, particularly preferably in the range from 50 to 150 nm. Non-porous, continuous binder layers of constant thickness are obtained.

FIG. 1 shows the layer arrangement according to the present invention, in which a support (T) is coated with a binder layer (B) and then with a dye layer (F) which has light-absorbing and also light-reflecting properties and produces, in combination with the other layers, the above-described advantageous characteristics of the recording medium.

Figure 2:
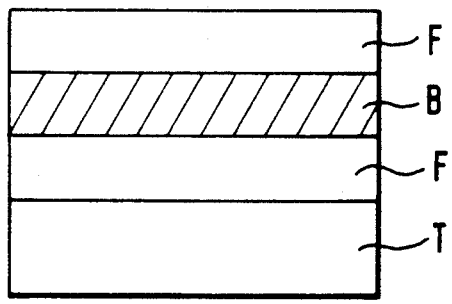
FIG. 2 shows an alternative layer arrangement according to the present invention.

The invention also relates to a multilayer system as shown in FIG. 2. In this recording medium, a naphthalocyanine-dye layer is vapor-deposited directly onto the support; on top of this dye layer a binder layer and another naphthalocyanine-dye layer are present. Due to the fact that the dyes are absolutely insoluble in the binders, there is no risk of dye particles migrating into the binder layer. The dye layer and the binder layer in this multilayer recording medium preferably have a thickness of 40 to 120 nm each.

The multilayer recording media of the present invention can, moreover, be used to form composite systems. For this purpose two units each of a multilayer recording medium are joined in such a way that the supports are, in each case, on the outside of the composite system produced. Systems of this kind also include a composite material formed of two recording media, each of which merely comprises a support and dye layer.

Both asymmetric and symmetric composite systems are feasible; symmetric systems are, however, preferred.

In the composite systems of the present invention, the multilayer recording media which are used in particular, are bonded together by means of adhesive layers.

Preferred are thermoplastic adhesives, hot setting adhesives and two-component adhesives and optionally also adhesives that are cross-linked with ultraviolet light. The composite systems can, moreover, be joined by double-side adhesive tapes or films.

The thickness of the bonding adhesive layers should amount to at least 0.1 mm and should preferably be below an upper limit of 0.6 mm.

By using the multilayer recording media of the present invention, which make it possible to vary the layer sequence and choose particular layer compositions, and also by using the composite systems of the present invention, which permit a considerable extension of the variations possible, the two groups of parameters which have an influence on the formation of holes, i.e., on the recording of information in the form of a pit-hole structure, can be brought into accord, layer by layer, and the layers can be arranged in such a way that both the recording sensitivity and the contrast ratio exhibit optimum values. The two groups of parameters include optical characteristics, such as absorption, reflection, etc., and thermal characteristics, such as softening range, flow behavior, etc.

The examples below are intended to explain the invention in further detail without, however, being limitative of the invention.

EXAMPLE 1

A 1.2 mm thick support of polycarbonate is spin-coated with a 1.5% by weight solution of cellulose nitrate (1.5 g of cellulose nitrate in 98.5 g of propylene glycol methyl ether containing about 35% by weight of n-butanol) such that a layer thickness of about 60 to 70 nm is obtained. The binder layer is dried and then an approximately 100 nm thick film of a naphthalocyanine dye, with $Me=AlCl^{2-}$, is vapor-deposited on the binder layer. The homogeneous recording layer has an olive-green color.

The dye layer is vapor-deposited in such a way that the dye which is present in an induction-heated tungsten vessel is deposited, in a vacuum of $1.3 \cdot 10^{-7}$ to $10^{-8}$ bars, onto a rotating disk of polycarbonate. The vapor-deposition speed is approx. 0.3 nm/s.

For comparison, a polycarbonate support of the same thickness, however, without a binder layer, is coated with an equally thick layer of the above naphthalocyanine dye.

The two samples are subjected to reflection and transmission measurements. In the process, the beam of a laser diode ($\lambda = 816$ nm, beam diameter = 4.5 mm, power = 3 mW) passes through the support which is rotated by means of an electromotor and reflection or, alternatively, transmission is measured. With the aid of an X-Y recorder the beam employed in each case is characterized according to its angle of rotation or via its radius.

The reflection (baseline reflectivity) of the sample according to the present invention is 23%, as measured through the support, while the reflection of the comparative sample is 25%.

The recording sensitivity, on the other hand, is measured by means of a laser diode having a variable recording power. A laser diode of $\lambda = 813$ nm is used and measurement is made in the recording power range from 2.2 to 12 mW, with an adjustment to write-pulse times of 100 to 250 ns.

Focusing of the radiation on the surface of the dye layer (the optimum diameter is 0.9 μm) and the entire measuring process are computer-controlled: After fixing ten power values in the range from 2.2 to 11.8 mW and a specific exposure time, e.g., of 250 ns, reflection and transmission are fully automatically recorded by means of a reading pulse (having a power of 0.5 mW for 100 ns); thereafter a write pulse is emitted and reflection and transmission are again measured. In this manner, the focus for all ten power values is scanned in steps of 0.5 μm.

The optimum reflection differences, R before and R after emitting the write pulse ($R_{bef}$ and $R_{aft}$), which are determined in each case, are plotted as the quotient $(R_{bef} - R_{aft})/R_{bef} \times 100 (\Delta R/R)$ versus the write-pulse energy (e.g., 0.55 to 2.95 nJ).

By the irradiated energy the layer is heated for a short time at the point of irradiation and, depending on the write-pulse energy, holes are obtained, which have different reflection values. The write-pulse energy, at which a contrast ratio ($\Delta R/R$) of, e.g., 50%, is obtained is a measure of the recording sensitivity.

Figure 4:
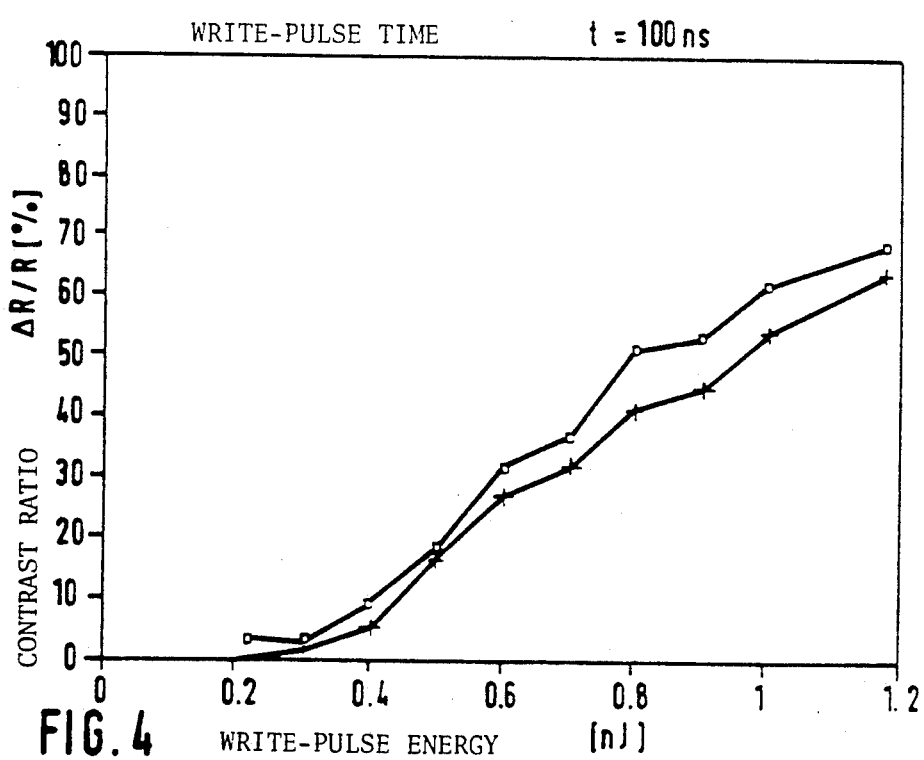
FIG. 4 is a plot of contrast ratio versus write-pulse energy for the recording media described in Example 1.

As can be seen from FIG. 4, the recording sensitivity of the recording medium according to the present invention (□), at a write-pulse time of t = 100 ns and $\Delta R/R = 50$%, is considerably higher than that of the comparative sample (+), since the sample according to the present invention requires a write-pulse energy of 0.8 nJ, which is substantially lower than the energy required by the comparative sample (0.97 nJ).

EXAMPLE 2

A support made of glass having a thickness of 1.1 mm is spin-coated with an approximately 100 nm thick layer of cellulose nitrate (solution according to Example 1). A naphthalocyanine-dye layer, with $Me=VO^{2+}$, is then vapor-deposited onto this binder layer, as described in Example 1. The vapor-deposited layer has a thickness of 100 nm.

For comparison, a polycarbonate support without binder layer is coated as described above, using the above-indicated dye in the same layer thickness.

The sample precoated with a binder layer shows a reflection of 22%, whereas the comparative sample has a reflection of 24%.

Figure 3:
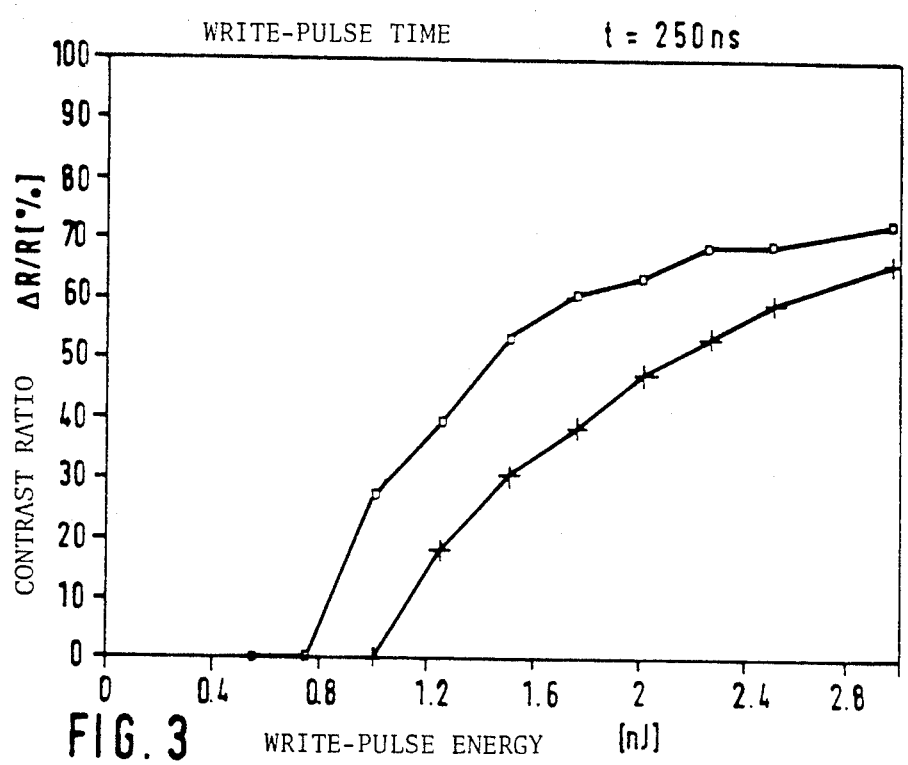
FIG. 3 is a plot of contrast ratio versus write-pulse energy for the recording media described in Example 2.

The recording sensitivities of the two recording media are shown in FIG. 3. At a write-pulse time of 250 ns and a contrast ratio ($\Delta R/R$) of 50% the multilayer recording medium (□) according to the present invention requires a write-pulse energy of only 1.45 nJ, whereas the comparative sample without binder layer (+) requires an energy of 2.15 nJ.

EXAMPLE 3

Polycarbonate supports having a thickness of 1.2 mm are spin-coated with 2% by weight solutions of different binders to give layer weights ranging from 80 to 120 mg/m². The binders used comprise:

(a) a polyamide resin (®Versalon 1112)
(b) a polyvinylacetal resin (®Mowital B 60 HH)
(c) a polystyrene resin (®PS 2)
(d) a hydrocarbon resin (®Resen 130/140).

According to Example 2, the precoated polycarbonate supports are homogeneously coated by vapor deposition with 100 nm thick layers of naphthalocyanine dyes, with $Me=VO^{2+}$.

The multilayer recording media (a), (c) and (d) exhibit reflection values of 20%, while sample (b) has a reflection of 27%.

Figure 5:
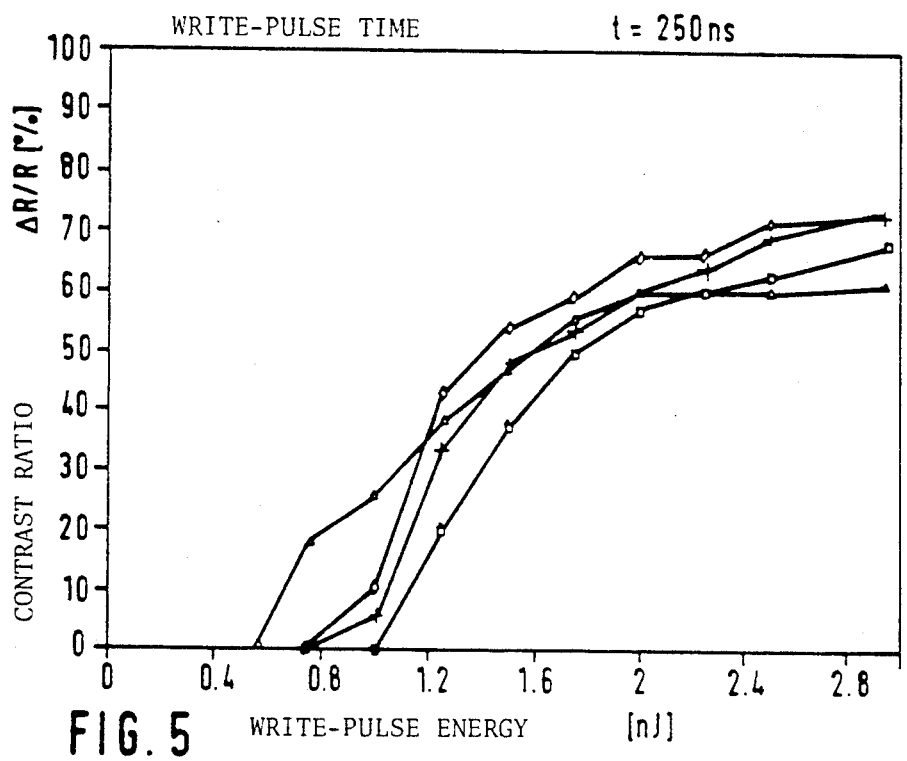
FIG. 5 is a plot of contrast ratio versus write-pulse energy for the recording media described in Example 3.

FIG. 5 shows the recording sensitivities at a write-pulse time of 250 ns. The write-pulse energy required at a contrast ratio ($\Delta R/R$) of 50% is: for sample (a) 1.75 nJ (□), for samples (b) (+) and (d) (△) 1.55 nJ and for sample (c) 1.4 nJ (◇).

EXAMPLE 4

A polycarbonate support having a thickness of 1.2 mm is spin-coated with a cellulose nitrate solution to give an 80 nm thick layer after drying.

A naphthalocyanine dye (Me=$SnCl_2^{2-}$) is then homogeneously vapor-deposited onto this layer, in a vacuum of $1.3 \times 10^{-7}$ to $10^{-8}$ bars. The vapor-deposited layer has a thickness of approximately 90 nm.

For comparison, a polycarbonate support which has not been coated with a binder layer is coated in the same manner with the same naphthalocyanine dye.

The multilayer recording medium according to the present invention shows a reflection of 22%, whereas the medium which has not been pretreated has a reflection of 23%.

Figure 6:
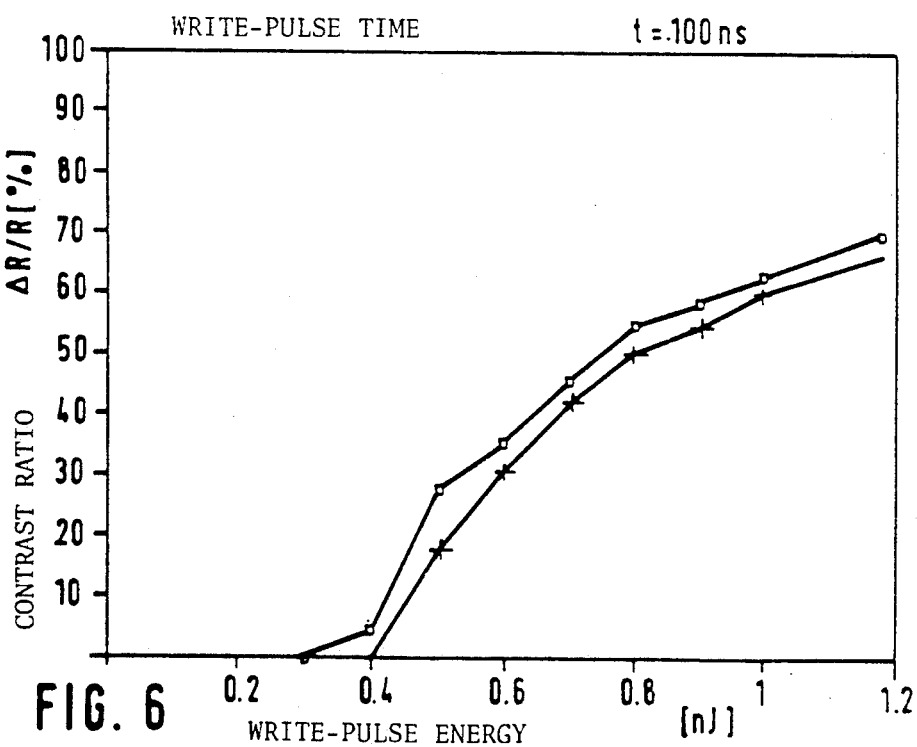
FIG. 6 is a plot of contrast ratio versus write-pulse energy for the recording media described in Example 4.

FIG. 6 shows the recording sensitivities of these recording media at a write-pulse time of 100 ns. The write-pulse energies required at a contrast ratio ($\Delta R/R$) of 50% are 0.74 nJ for the sample according to the present invention ($\square$) and 0.8 nJ for the comparative sample (+).

EXAMPLE 5

In this example, the temperature stability of the vapor-deposited dye layer is determined.

Two polycarbonate supports, one of which has been coated with a cellulose nitrate solution to produce a layer of 80 mg/cm$^2$, are homogeneously coated by vapor deposition with a naphthalocyanine dye (Me=$VO^{2-}$). The pretreated support carries a 150 nm thick dye layer. The support which has not been pretreated has a dye layer thickness of 130 nm.

Both recording media are stored for 7 days at 80° C. After the termination of this long-term test, transmission and reflection are determined as described in Example 1. It is found that the recording medium without precoating does not show any reduction of its transmission of 6% and its reflection of 20%, just as the recording medium according to the present invention, in which the transmission of 4% and the reflection of 18% remain constant.

EXAMPLE 6

According to Example 2, a 50 nm thick layer of a naphthalocyanine dye (Me=$VO^{2+}$) is vapor-deposited onto a polycarbonate support. This layer is coated with a 100 nm thick cellulose nitrate layer and then another 50 nm thick layer of the same naphthalocyanine dye as used for the first layer is applied by vapor deposition.

Figure 7:
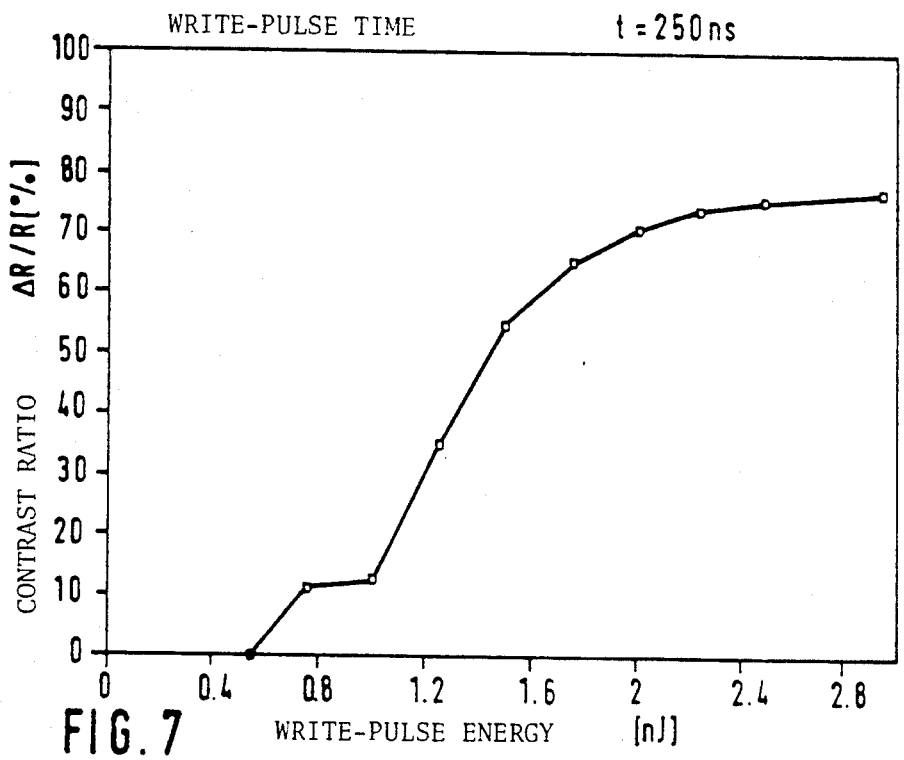
FIG. 7 is a plot of contrast ratio versus write-pulse energy for the recording medium described in Example 6.

Reflection as measured through the support is 17%. The recording sensitivity is shown in FIG. 7. Recording sensitivity is determined at a write-pulse time of 250 ns. At a contrast ratio ($\Delta R/R$) of 50% the write-pulse energy is 1.42 nJ ($\square$).

EXAMPLE 7

A polycarbonate support is coated with a naphthalocyanine dye (Me=$VO^{2+}$) up to a layer thickness of 130 to 140 nm. A transfer adhesive tape (®Scotch) with spacing film is laminated to the dye layer after removing the first protective film from the adhesive tape, such that the dye layer and the adhesive layer (in this case an acrylate adhesive) are in intimate contact with each other. After removing the second protective film from the transfer adhesive tape, another polycarbonate support is laminated on top to form an asymmetric, entirely adhesive-bonded sandwich structure (composite system).

Figure 8:
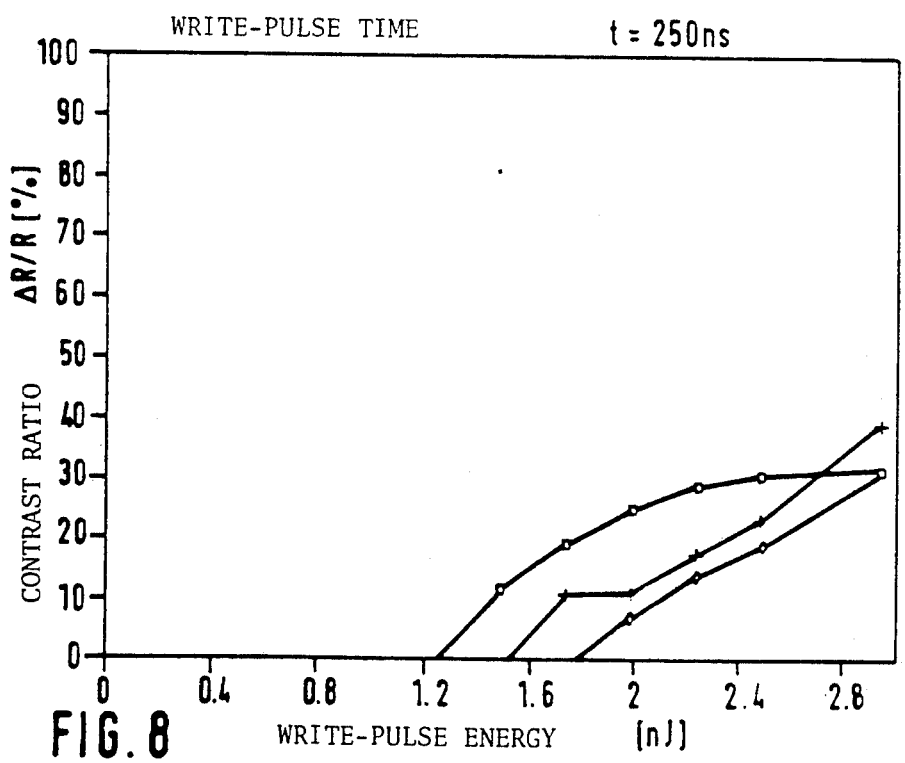
FIG. 8 is a plot of contrast ratio versus write-pulse energy for recording media described in Example 7.

FIG. 8 shows the recording sensitivities of the vapor-coated polycarbonate support material ($\square$), of the material that additionally carries the transfer adhesive tape (+) and of the complete sandwich structure ($\Diamond$). As in Example 1, the values are determined by means of measurement through the support at a write-pulse time of 250 ns.

Figure 9:
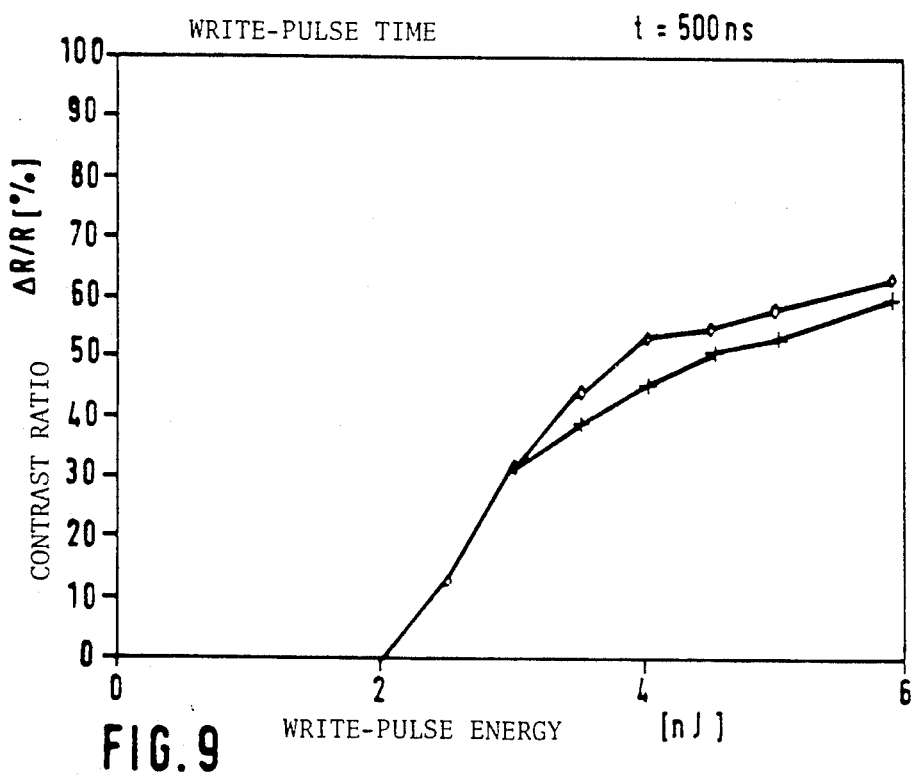
FIG. 9 is a plot of contrast ratio versus write-pulse energy for recording media described in Example 7.

FIG. 9 shows the recording sensitivities of the material carrying the transfer adhesive tape (+) and of the sandwich structure ($\Diamond$) at a write-pulse time of 500 ns. According to 1, measurement is effected through the dye-coated support. It is also possible to determine, in each case, the write-pulse energy at a contrast ratio ($\Delta R/R$) of 50%, which amounts to 3.75 nJ for the sandwich structure and 4.3 nJ for the material carrying the adhesive tape.

EXAMPLE 8

A 1.1 mm thick polycarbonate support is coated by vapor deposition with a layer of a naphthalocyanine dye (Me=$VO^{2-}$) having a thickness of 140 nm. The dye layer is spin-coated with a binder layer of polyvinyl acetal (®Mowital) up to a layer weight of about 100 mg/m$^2$.

The binder layer is dried and then a transfer adhesive tape with spacing film (®Scotch) from which one protective film has been peeled off is laminated to the binder layer. After removing the second protective film another polycarbonate support is superposed to produce a composite system.

Figure 10:
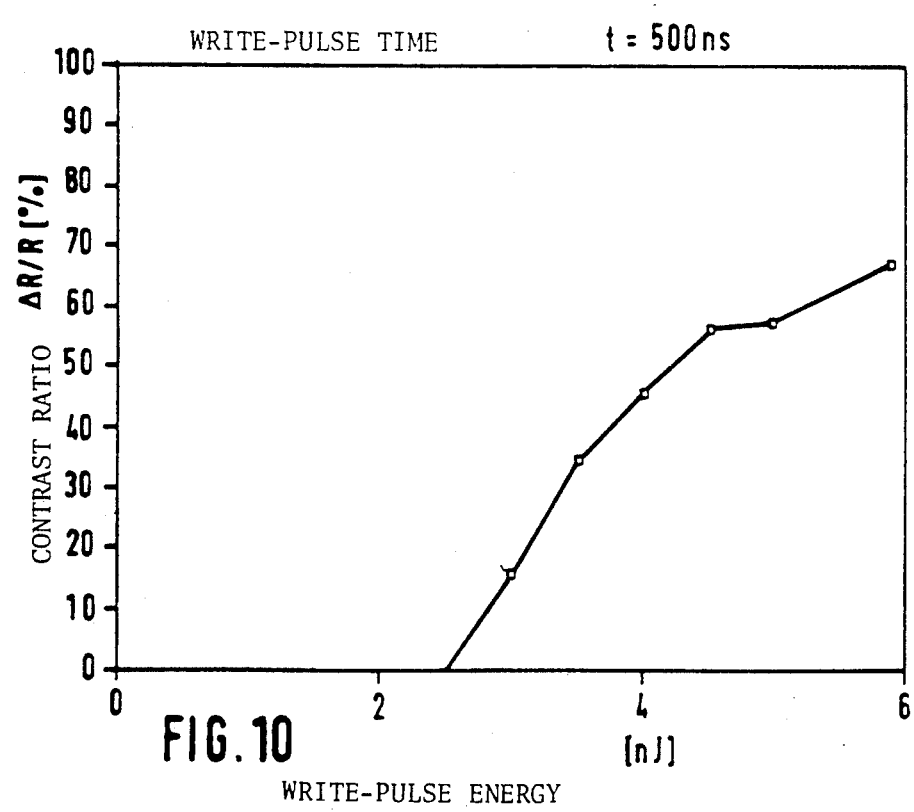
FIG. 10 is a plot of contrast ratio versus write-pulse energy for the recording medium described in Example 8.

According to Example 1, this material is subjected to measurement through the dye-coated support. The recording sensitivity is shown in FIG. 10. At a contrast ratio ($\Delta R/R$) of 50% a write-pulse energy of 4.2 nJ is required.

EXAMPLE 9

A polycarbonate support is coated by vapor deposition with a 140 nm thick layer of a naphthalocyanine dye (Me=$VO^{2+}$). After removing the protective film from a self-adhesive, high-efficiency bonding system (®Scotch-VHB: "Acrylic Foam" Y 4930), the latter is laminated to the dye layer. Then the second protective film is removed from the bonding system and another polycarbonate support is pressed on so that, also in this case, an asymmetric composite system is formed.

Figure 11:
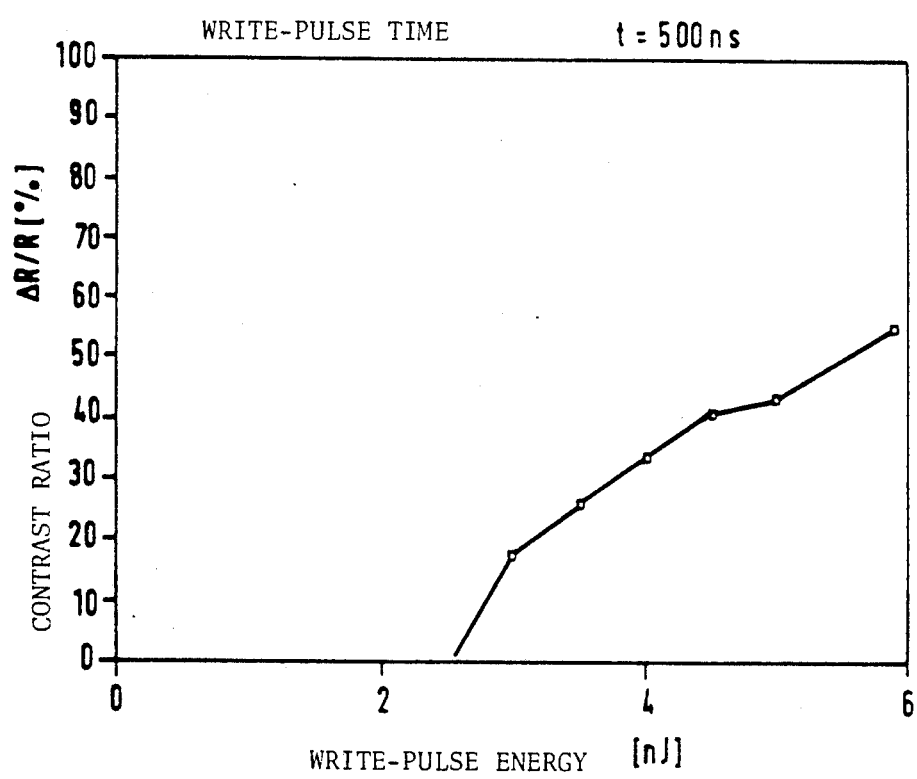
FIG. 11 is a plot of contrast ratio versus write-pulse energy for the recording media described in Example 9.

FIG. 11 shows the recording sensitivity measured through the dye-coated support, as described in Example 1. At a write-pulse time of 500 ns the write-pulse energy required for a contrast ratio ($\Delta R/R$) of 50% is found to be 5.5 nJ.

What is claimed is:

1. A multilayer recording medium for optical information, which can be used for a single recording operation, comprising:
   a support;
   a layer having a thickness ranging from 30 to 200 nm, comprising an unsubstituted naphthalocyanine dye of the formula I;

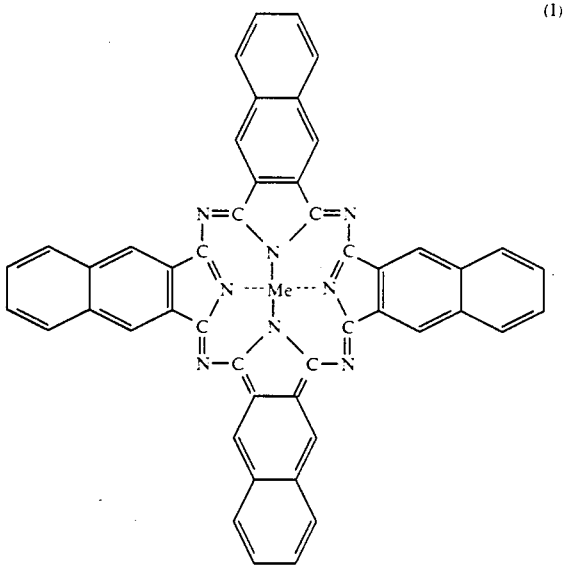

(I)

wherein
Me either denotes two hydrogen atoms or a metal selected from the group consisting of Cu, Zn, Al, Ga, In, Si, G, Sn, Pb, Mg, Ti, V, Cr, Mn, Fe, Co, Ni and Pd; and a binder layer having a thickness in the range from 30 to 300 nm positioned between the support and the naphthalocyanine-dye layer, wherein the binder comprises a thermoplastic material having a low softening temperature, as compared with the dye.

2. A recording medium as claimed in claim 1, wherein the naphthalocyanine dye used comprises a compound of the general formula I, in which Me represents $VO^{2-}$, $AlCl^{2-}$, $SnCl_2^{2-}$ or Zn.

3. A recording medium as claimed in claim 1, wherein the dye layer has a high absorptivity in the wavelength region from 750 to 860 nm.

4. A recording medium as claimed in claim 3, wherein the dye layer has a high absorptivity in the wavelength region from 800 to 850 nm.

5. A recording medium as claimed in claim 1, wherein the dye layer has a thickness ranging from 60 to 130 nm.

6. A recording medium as claimed in claim 1, wherein the binder layer has a thickness in the range from 50 to 150 nm.

7. A recording medium as claimed in claim 1, additionally comprising another naphthalocyanine dye layer between the binder and the support.

8. A composite system, comprising two units of a recording medium selected from the group consisting of (a) a support and a naphthalocyanine-dye layer; (b) a multilayer recording medium comprising a support; a layer comprising an unsubstituted naphthalocyanine dye; and a binder layer between the support and the naphthalocyanine-dye layer; and (c) a multilayer recording medium comprising a support; a layer comprising an unsubstituted naphthalocyanine dye; a binder layer between the support and the naphthalocyanine-dye layer; and another naphthalocyanine dye layer between the binder and the support, wherein one of the units is a multilayer recording medium comprising a support; a layer comprising an unsubstituted naphthalocyanine dye; a binder layer between the support and the naphthalocyanine-dye layer; and another naphthalocyanine dye layer between the binder and the support, and wherein said units are joined such that the respective supports are on the outside of the composite system.

9. A composite system as claimed in claim 8, wherein the units are bonded together by means of an adhesive layer which has a thickness of at least 0.1 mm.

10. A recording medium as claimed in claim 1, wherein the dye layer has a thickness ranging from 90 to 120 nm.

11. A recording medium as claimed in claim 1, wherein the naphthalocyanine dye used comprises a compound of the general formula I, in which Me represents $VO^{2-}$.

12. A composite system as recited in claim 8, wherein the other unit is a multilayer recording medium comprising a support, a layer comprising an unsubstituted naphthalocyanine dye, a binder layer between the support and the naphthalocyanine-dye layer, and another naphthalocyanine dye layer between the binder and the support.

13. A composite system as recited in claim 8, wherein the other unit, wherein one of the units is a multilayer recording medium comprising a support, a layer comprising an unsubstituted naphthalocyanine dye, and a binder layer between the support and the naphthalocyanine-dye layer.

14. A composite system as recited in claim 13, wherein the other unit is a multilayer recording medium comprising a support and a naphthalocyanine-dye layer.

15. A recording medium as claimed in claim 1, wherein the binder is selected from the group consisting of cellulose nitrates and polystyrenes.

16. A recording medium as claimed in claim 1, wherein the binder decomposes at a temperature above about $200°$ C.

17. A recording medium as claimed in claim 1, comprising a vacuum-deposited dye layer.

18. A method of optically recording information comprising the steps of:
providing a multilayer optical recording medium as recited in claim 1; and
irradiating said medium with light having a wavelength between 800 and 850 nm to record information in said medium.

19. A composite system, comprising two units, wherein a first unit is a multilayer recording medium according to claim 1 and a second unit is a multilayer recording medium selected from the group consisting of (a) a support and a naphthalocyanine-dye layer; (b) a multilayer recording medium comprising a support; a layer comprising an unsubstituted naphthalocyanine dye; and a binder layer between the support and the naphthalocyanine-dye layer; and (c) a multilayer recording medium comprising a support; a layer comprising an unsubstituted naphthalocyanine dye; a binder layer between the support and the naphthalocyanine-dye layer; and another naphthalocyanine dye layer between the binder and the support, wherein said units are joined such that the respective supports are on the outside of the composite system.

20. A composite system as recited in claim 19, wherein the second unit is a unit of type (a).

21. A composite system as recited in claim 19, wherein the second unit is a unit of type (b).

22. A composite system as recited in claim 19, wherein the second unit is a unit of type (c).

* * * * *

UNITED STATES PATENT AND TRADEMARK OFFICE
CERTIFICATE OF CORRECTION

PATENT NO. : 5,151,342
DATED : September 29, 1992
INVENTOR(S) : Wolfgang WIEDEMANN It is certified that error appears in the above-indentified patent and that said Letters Patent is hereby corrected as shown below:

Column 4, line 27, "AlX$^{2-}$" should read --AlX$^{2+}$--; line 28, "SnX$^{2-}$" should read --SnX$^{2+}$--; line 29, "VO$^{2-}$" should read --VO$^{2+}$--;

line 47, "VO$^{2-}$" should read --VO$^{2+}$--; "AlC$^{2-}$" should read --AlC$^{2+}$--; "SnCl$_2^{2-}$" should read --SnCl$_2^{2+}$--.

Column 9, line 6, delete "SnCl$_2^{2-}$" and insert --SnCl$_2^{2+}$--;

UNITED STATES PATENT AND TRADEMARK OFFICE
CERTIFICATE OF CORRECTION

PATENT NO. : 5,151,342
DATED : September 29, 1992
INVENTOR(S) : Wolfgang WIEDEMANN It is certified that error appears in the above-indentified patent and that said Letters Patent is hereby corrected as shown below:

lines 31, 47 and 60, delete "$VO^{2-}$" and insert --$VO^{2+}$--.

Column 10, lines 26 and 47, delete "$VO^{2-}$" and insert --$VO^{2+}$--.

Claim 2, line 3, delete "$VO^{2-}$" and insert --$VO^{2+}$--.
      line 4, delete "$AlCl^{2-}$" and insert --$AlCl^{2+}$--; delete "$SnCl_2^{2-}$" and insert --$SnCl_2^{2+}$--.

Claim 13, line 2, delete "wherein one of the units".

Signed and Sealed this

Tenth Day of June, 1997

Attest:

BRUCE LEHMAN

*Attesting Officer*       *Commissioner of Patents and Trademarks*